US008988498B2

(12) United States Patent
Kim et al.

(10) Patent No.: US 8,988,498 B2
(45) Date of Patent: Mar. 24, 2015

(54) METHOD FOR CONTROLLING OPERATIONS OF IMAGE DISPLAY APPARATUS AND SHUTTER GLASSES USED FOR THE IMAGE DISPLAY APPARATUS

(75) Inventors: Sanghyun Kim, Seoul (KR); Hagryang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 999 days.

(21) Appl. No.: 13/097,574

(22) Filed: Apr. 29, 2011

(65) Prior Publication Data
US 2011/0267425 A1   Nov. 3, 2011

(30) Foreign Application Priority Data

Apr. 30, 2010   (KR) .................. 10-2010-0040975

(51) Int. Cl.
| | |
|---|---|
| *H04N 15/00* | (2006.01) |
| *H04N 13/00* | (2006.01) |
| *G05B 11/01* | (2006.01) |
| *G08C 19/16* | (2006.01) |
| *G06F 3/033* | (2013.01) |
| *G09G 5/08* | (2006.01) |
| *G06F 3/00* | (2006.01) |
| *G06F 13/00* | (2006.01) |
| *H04N 5/445* | (2011.01) |
| *H04N 13/04* | (2006.01) |

(52) U.S. Cl.
CPC ....... *H04N 13/0438* (2013.01); *H04N 13/0497* (2013.01)
USPC ............. 348/43; 340/12.29; 345/158; 725/39

(58) Field of Classification Search
CPC ................. H04N 13/0497; H04N 13/0438
USPC .......................................................... 348/43
See application file for complete search history.

(56) References Cited

U.S. PATENT DOCUMENTS

| | | | |
|---|---|---|---|
| 2006/0109138 A1* | 5/2006 | Chiang .................... | 340/825.69 |
| 2009/0195407 A1 | 8/2009 | Nakano et al. ........... | 340/825.69 |
| 2010/0194857 A1* | 8/2010 | Mentz et al. ..................... | 348/43 |
| 2010/0302154 A1* | 12/2010 | Lee et al. ....................... | 345/158 |
| 2011/0225611 A1* | 9/2011 | Shintani ......................... | 725/39 |

FOREIGN PATENT DOCUMENTS

| | | |
|---|---|---|
| EP | 1 947 621 A2 | 7/2008 |
| WO | WO 97/43681 A1 | 11/1997 |
| WO | WO 2009/047473 A2 | 4/2009 |

OTHER PUBLICATIONS

European Search Report dated Jul. 1, 2014, issued in Application No. 11003560.7.

* cited by examiner

*Primary Examiner* — Hee-Yong Kim
(74) *Attorney, Agent, or Firm* — KED & Associates LLP

(57) ABSTRACT

A method for controlling operations of an image display apparatus and shutter glasses are disclosed. The method for controlling an operation of the image display apparatus includes transmitting a signal including information about channels available as a pairing channel to a remote controller in response to key code information of the remote controller received from the remote controller, receiving from the remote controller a signal including information about a channel selected by the remote controller from among the channels available as a pairing channel, establishing the channel selected by the remote controller as a pairing channel of the remote controller, and establishing the pairing channel of the remote controller as a pairing channel of shutter glasses.

27 Claims, 13 Drawing Sheets

FIG. 4
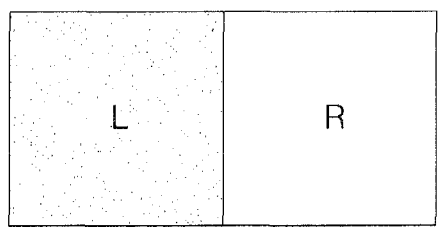
(a)
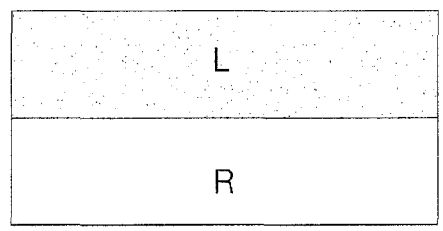
(b)
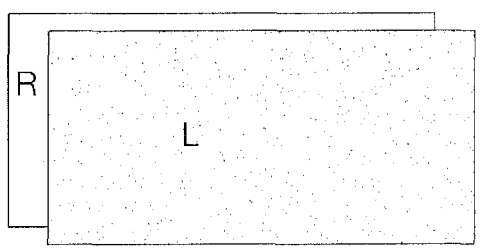
(c)
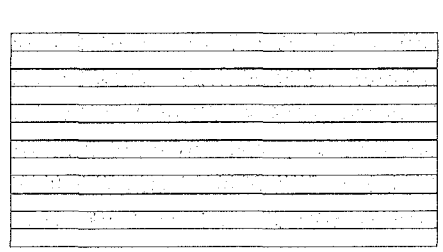
(d)
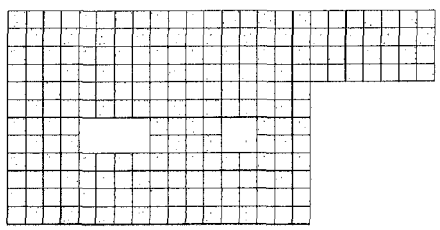

FIG. 5
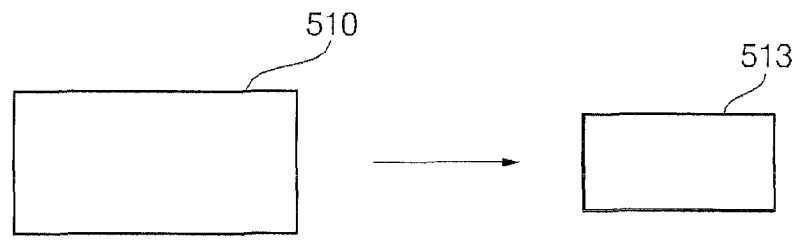
(a)
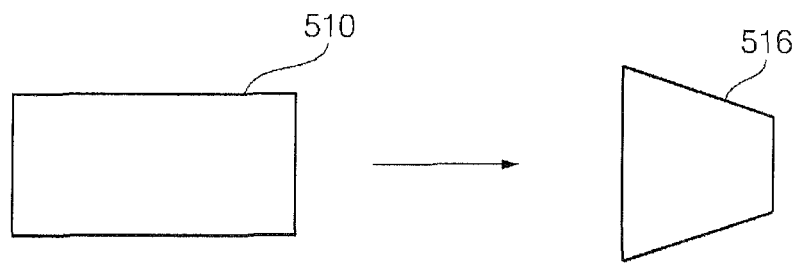
(b)
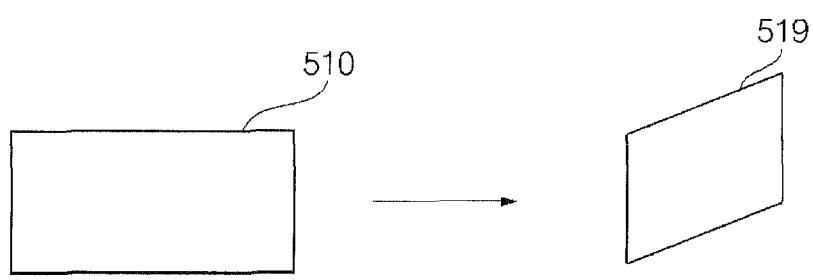
(c)

FIG. 7
(a)
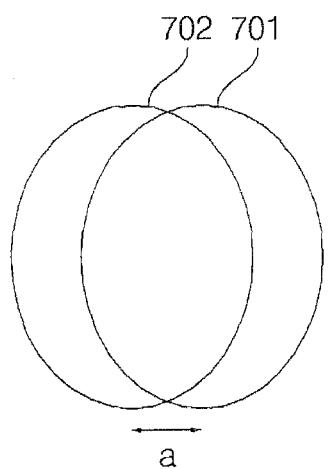
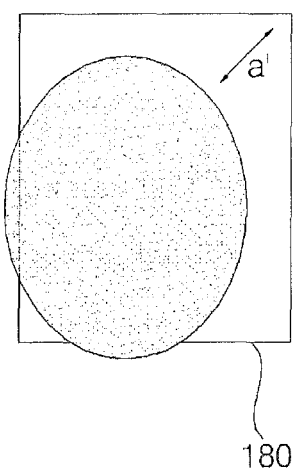
(b)
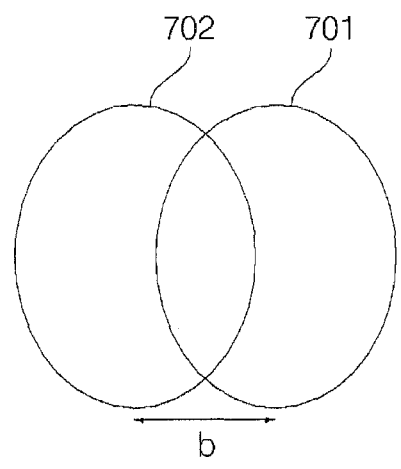
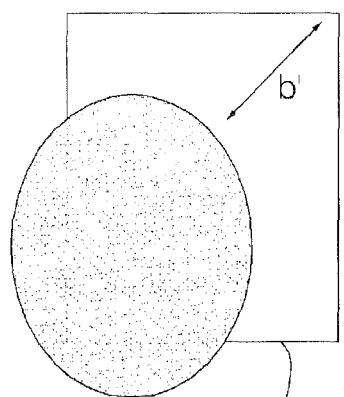

METHOD FOR CONTROLLING OPERATIONS OF IMAGE DISPLAY APPARATUS AND SHUTTER GLASSES USED FOR THE IMAGE DISPLAY APPARATUS

CROSS-REFERENCE TO RELATED APPLICATION(S)

This application claims priority under 35 U.S.C. §119 to Korean Application No. 10-2010-0040975 filed on Apr. 30, 2010, whose entire disclosure(s) is/are hereby incorporated by reference.

BACKGROUND

1. Field

The present invention relates to a method for controlling operations of an image display apparatus and shutter glasses used for the image display apparatus, and more particularly, to a method for controlling an operation of an image display apparatus for displaying a plurality of viewpoint images perceived as a three-dimensional (3D) image to a user wearing shutter glasses and a method for controlling an operation of the shutter glasses.

2. Background

An image display apparatus had as function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

Extensive research has recently been conducted on 3D images and a variety of content items that can be provided through 3D images. In addition, 3D stereoscopy has been widely used and commercialized in various environments and technologies. 3D images can be transmitted by the afore-described digital broadcasting and an apparatus for reproducing such 3D images is under development.

BRIEF DESCRIPTION OF THE DRAWINGS

The embodiments will be described in detail with reference to the following drawings in which like reference numerals refer to like elements wherein:

FIG. 4 illustrates three-dimensional (3D) formats available for 3D visualization;

FIG. 5 illustrates various methods for scaling a 3D image according to an embodiment of the present invention;

FIGS. 6 and 7 illustrate different depth illusions of 3D images or 3D objects according to an embodiment of the present invention;

DETAILED DESCRIPTION

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
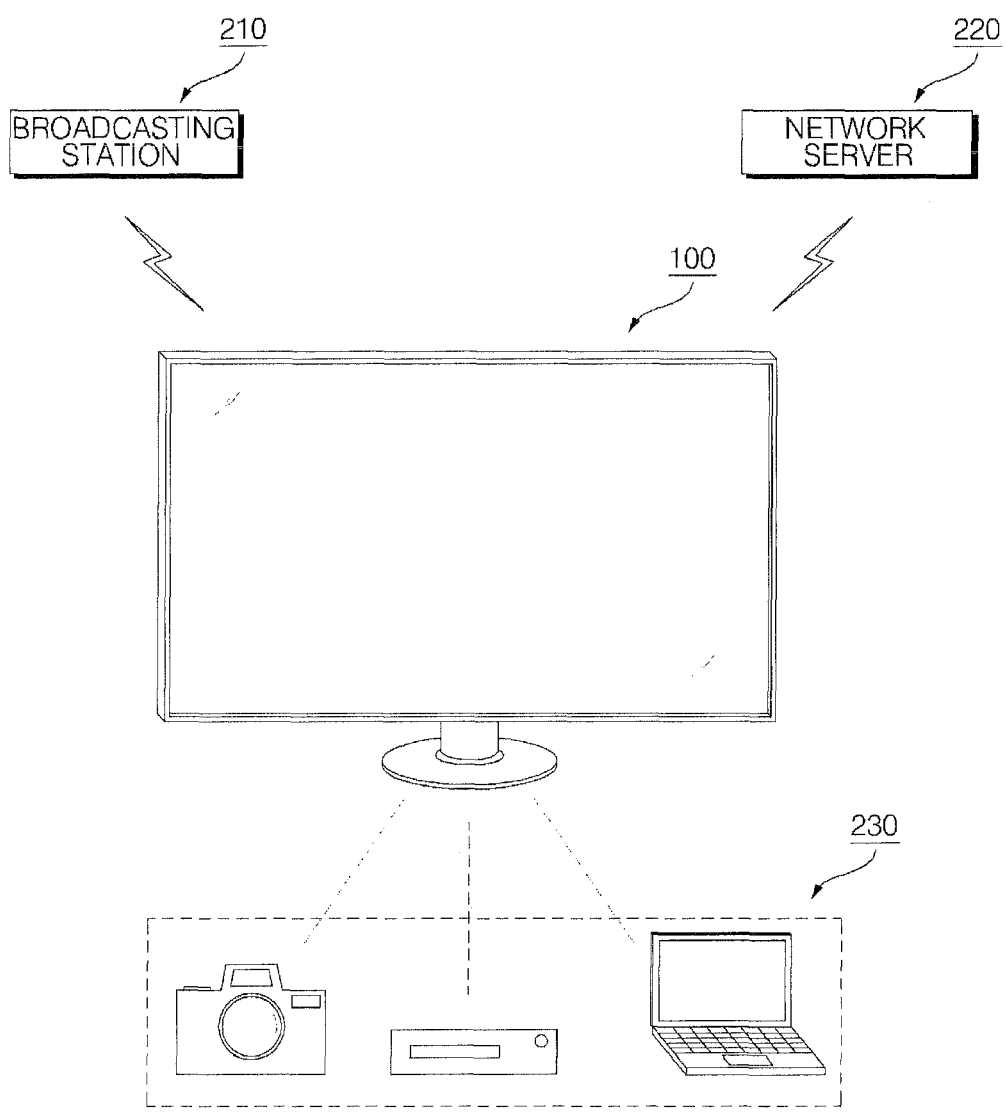
FIG. 1 is a block diagram of an image display system according to an embodiment of the present invention.

FIG. 1 illustrates the configuration of an image display system according to an embodiment of the present invention.

Referring to FIG. 1, an image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A content provider may provide content to the image display apparatus 100 through the network server 220.

The image display apparatus 100 may communicate with the external device 230. The external device 230 can transmit and receive signals directly to and from the image display apparatus 100 wirelessly or by cable. For instance, the external device 230 may be a media storage device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 2:
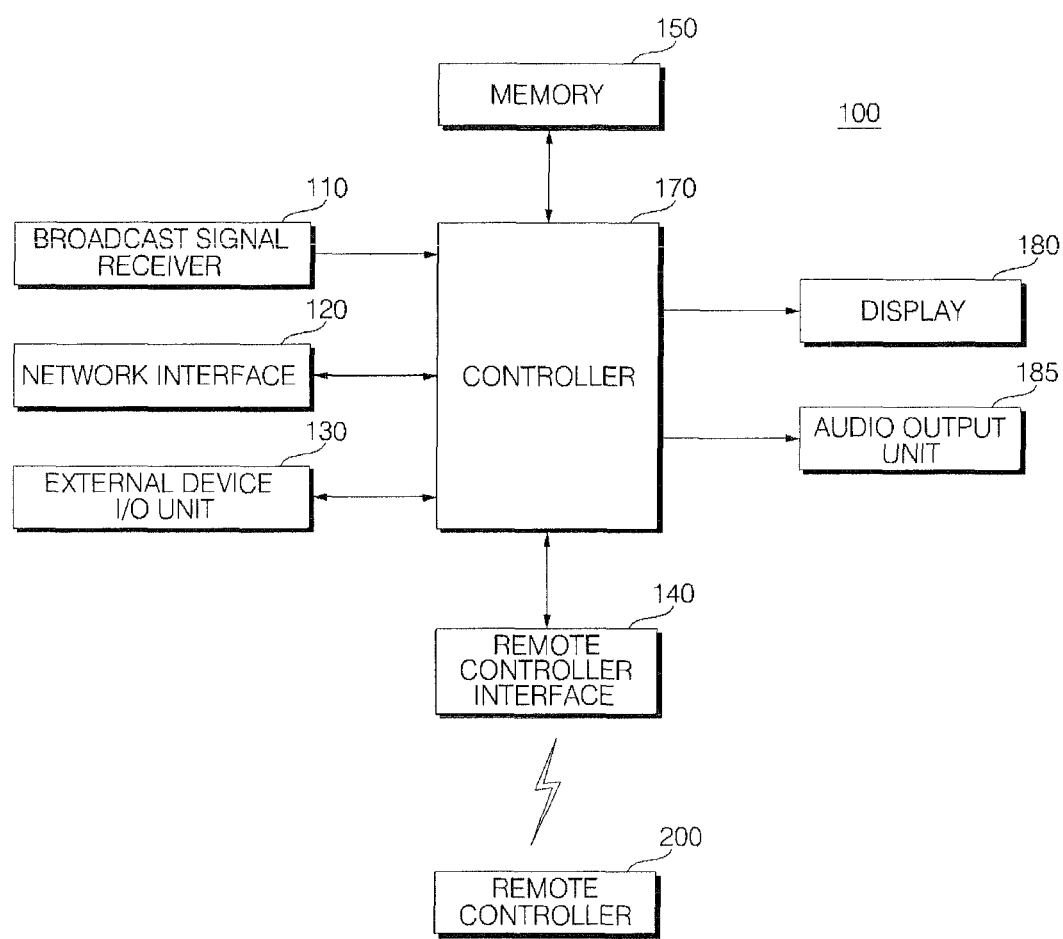
FIG. 2 is a block diagram of an image display apparatus according to an embodiment of the present invention.

FIG. 2 is a block diagram of the image display apparatus according to an embodiment of the present invention.

Referring to FIG. 2, the image display apparatus 100 according to the embodiment of the present invention includes a broadcast signal receiver 110, a network interface 120, an external device Input/Output (I/O) unit 130, a remote controller interface 140, a memory 150, a controller 170, a display 180, and an audio output unit 185.

The broadcast signal receiver 110 may receive a Radio Frequency (RF) broadcast signal corresponding to a channel selected by a user or a number of RF broadcast signals corresponding to all broadcast channels previously added to the image display apparatus 100 from among a plurality of RF broadcast signals received through an antenna from the broadcasting station 210 in FIG. 1 and may downconvert the RF broadcast signal into a digital Intermediate Frequency (IF) signal or an analog baseband Audio/Video (A/V) signal.

The broadcast signal receiver 110 may be capable of receiving RF broadcast signals from an Advanced Television Systems Committee (ATSC) single-carrier system or from a Digital Video Broadcasting (DVB) multi-carrier system. In addition, the broadcast signal receiver 110 may sequentially select a number of RF broadcast signals corresponding to all broadcast channels previously added to the image display apparatus 100 by a channel add function from among a plurality of RF signals received through the antenna, and may downconvert the selected RF broadcast signals into IF signals or baseband A/V signals. This operation is performed to display a thumbnail list including a plurality of thumbnail images corresponding to broadcast channels on the display 180. Therefore, the broadcast signal receiver 110 may sequentially/periodically receive an RF broadcast signal of a selected channel or RF broadcast signals of all previously stored channels.

The network interface 120 interfaces between the image display apparatus 100 and a wired/wireless network such as the Internet or between the image display apparatus 100 and the network server 220 in FIG. 1.

For wireless connection of the image display apparatus 100 to the Internet, the network interface 120 may include a wireless communication module. For the wireless connectivity, the network interface 120 may operate in conformance with communication standards such as Wireless Local Area Network (WLAN) (i.e. Wi-Fi), Wireless Broadband (WiBro), World Interoperability for Microwave Access (WiMax), and High Speed Downlink Packet Access (HSDPA).

The network interface 120 may receive content or data from a content provider or a network provider over a network. The received content or data may include content such as games, Video-on-Demand (VoD) files, and broadcast signals, and information related to the content. The network interface 120 may also receive update information and update files of firmware from a network operator.

The network interface 120 may be connected to a communication network for enabling video or voice calls. The term 'communication network' as used herein covers a broadcasting communication network, a Public Switched Telecommunication Network (PSTN), and a mobile communication network, which are connected via a LAN.

The external device I/O unit 130 may connect the external device (230 in FIG. 1) to the image display apparatus 100. For the purpose, the external device I/O unit 130 may include an A/V I/O unit (not shown) or a wireless communication module (not shown).

The external device I/O unit 130 is connected wirelessly or by cable to an external device such as a Digital Versatile Disc (DVD) player, a Blu-ray player, a game console, a camera, a camcorder, or a computer (e.g., a laptop computer). Then, the external device I/O unit 130 externally receives video, audio, and/or data signals from the external device and transmits the received external input signals to the controller 170. In addition, the external device I/O unit 130 may output video, audio, and data signals processed by the controller 170 to the external device.

In order to receive or transmit A/V signals from or to the external device, the A/V I/O unit of the external device I/O unit 130 may include at least one of an Ethernet port, a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, or a D-sub port.

The wireless communication module of the external device I/O unit 130 may conduct wireless communication with other external devices. For the wireless communication, the wireless communication module may be connected to other external devices over a network according to communication standards such as Bluetooth, Radio Frequency Identification (RFID), Infrared Data Association (IrDA), Ultra WideBand (UWB), and Zigbee.

The external device I/O unit 130 may be connected to various set-top boxes through at least one of the afore-mentioned ports and may thus receive data from or transmit data to the various set-top boxes.

For example, the external device I/O unit 130 may be connected to an IPTV set-top box. To enable interactive communication, the external device I/O unit 130 may provide video, audio and/or data signals received from the IPTV set-top box to the controller 170 and provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), and Internet TV and full-browsing TV which are capable of providing Internet access services.

The remote controller interface 140 may include a wireless communication module which wirelessly transmits signals to and/or wirelessly receives signals from a remote controller 200, and a coordinate calculator which calculates a pair of coordinates representing the position of a pointer on the display 180, which is to be moved in accordance with the movement of the remote controller 200. The remote controller interface 140 may wirelessly transmit RF signals to and/or wirelessly receive RF signals from the remote controller 200 through an RF module and may wirelessly receive IR signals from the remote controller 200 through an IR module according to the IR communication standard.

The coordinate calculator may receive motion information regarding the movement of the remote controller 200 from the wireless communication module and may calculate a pair of coordinates (x, y) representing the position of the pointer on a screen of the display 180 by correcting the motion information for possible errors such as user hand tremor.

A signal received in the image display apparatus 100 from the remote controller 200 through the remote controller interface 140 may be transmitted to the controller 170. Then, the controller 170 may acquire information regarding the movement of the remote controller 200 and information regarding a key manipulation detected from the remote controller from the signal received from the remote controller 200, and may control the image display apparatus 100 based on the acquired information.

In another example, the remote controller 200 may calculate the coordinates of the pointer in correspondence with a motion of the remote controller 200 and transmit the coordinates to the remote controller interface 140. In this case, the remote controller interface 140 may not correct errors in the coordinates of the pointer, prior to transmission to the controller 170.

The memory 150 may store a video signal received at the image display apparatus 100 and an audio signal and/or a data signal associated with the video signal. For example, a video recording command may be input to the image display apparatus 100 during playing a video based on a broadcast signal. The image display apparatus 100 may store at least a part of the video in the memory 150 in response to the video recording command. Upon receipt of a video playback command, the image display apparatus 100 may refer to the video signal and the audio and/or data signal associated with the video signal, which are stored in the memory 150 and may play back the video based on the video, audio and/or data signals.

The controller 170 provides overall control to the image display apparatus 100. The controller 170 may receive a signal from the remote controller 200 or any other kind of control command input device, or may receive a command through a local key of the image display apparatus 100. The controller 170 identifies the command included in the received signal or the command corresponding to the input of the local key and controls the image display apparatus 100 according to the command.

For example, upon receipt of a channel selection command from a user, the controller 170 may control the broadcast signal receiver 110 to receive a broadcast signal on a channel selected in accordance with the channel selection command, process the video and audio signals of the broadcast signal, and output the processed video and audio signals to the display 180 and the audio output unit 185, respectively. In addition, the controller 170 may output information about the user-selected channel along with video and audio signals to the display 180 or the audio output unit 185.

The controller 170 may process a video or audio signal based on information included in a data signal received along with the video or audio signal. For example, the controller 170 may identify the format of a video signal input to the image display apparatus 100 using a data signal associated with the video signal and process the video signal according to the identified format.

The controller 170 may generate an On Screen Display (OSD) signal for displaying an OSD related to an image based on a video signal, using a data signal associated with the video signal. In addition, the controller 170 may create a Graphical User Interface (GUI) through which the user can check information about the image display apparatus 100 or enter a control command to the image display apparatus 100.

The user may input a video or audio output command using the remote controller 200 or any other kind of control command input device. For instance, the user may want to view an image captured by a camera or a camcorder through the external device I/O unit 130. Then the controller 170 may process a video or audio signal received through the USB port of the external device I/O unit 130 so that an image or sound corresponding to the video or audio signal can be output to the display 180 or the audio output unit 185.

In an embodiment of the present invention, the controller 170 may process an external input two-dimensional (2D) or 3D video signal so that the 2D or 3D signal can be displayed on the display 180. The controller 170 may also process a video signal to display a GUI in 3D on the display 180. The configuration of the controller 170 will be described later in greater detail with reference to FIG. 3.

The display 180 may generate drive signals by converting a processed video signal, a processed data signal, an OSD signal, and a control signal received from the controller 170 or a video signal and a data signal received from the external device I/O unit 130 and display screens on the display 180 according to the drive signals. The display 180 may be various types of displays such as a Plasma Display Panel (PDP), a Liquid Crystal Display (LCD), an Organic Light-Emitting Diode (OLED) display, and a flexible display. The display 180 is capable of displaying 3D images according to an embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, polarized glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses, shutter glasses, and spectrum filters are available.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as voice. The audio output unit 185 may be various types of speakers.

Figure 3:
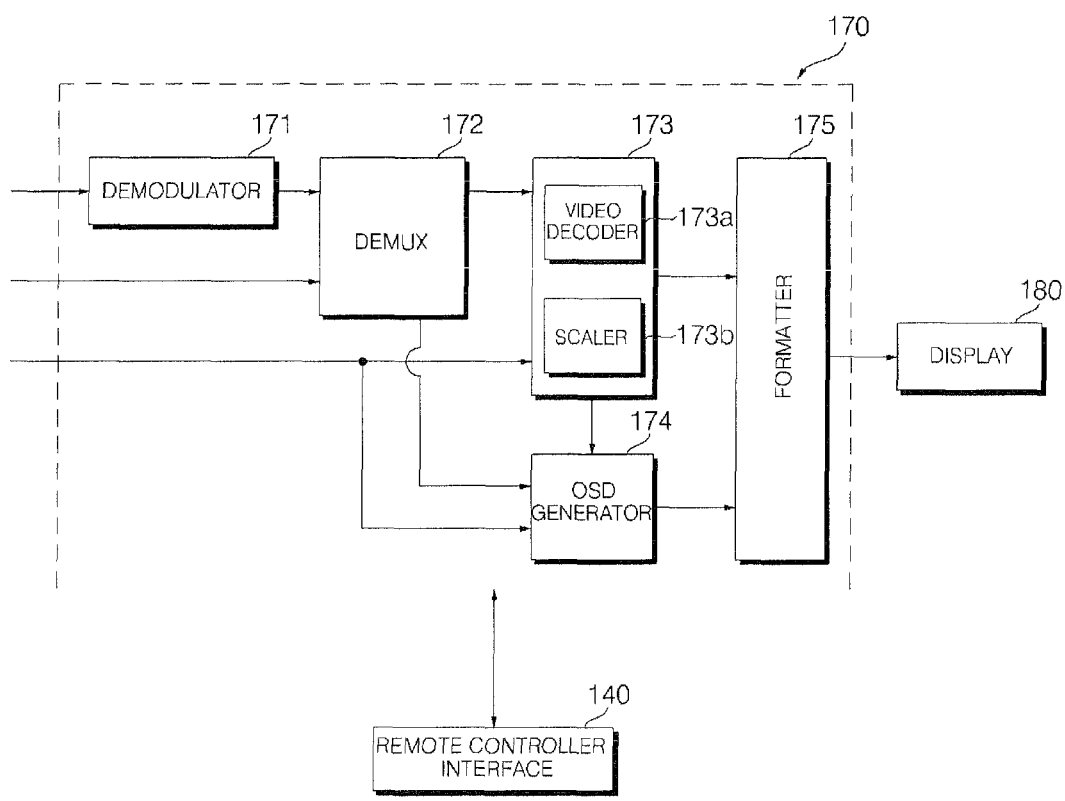
FIG. 3 is a block diagram of a controller illustrated in FIG. 2.

FIG. 3 is a block diagram of the controller illustrated in FIG. 2.

Referring to FIG. 3, the controller 170 may include a demodulator 171, a Demultiplexer (DEMUX) 172, a decoder 173, an OSD generator 174, and a formatter 175 according to an embodiment of the present invention. The demodulator 171 may demodulate a broadcast signal received from the broadcast signal receiver 110.

For example, the demodulator 171 receives the digital IF signal DIF from the broadcast signal receiver 110 and demodulates the digital IF signal DIF. The demodulator 171 may also perform channel decoding on the digital IF signal DIF. For channel decoding, the demodulator 171 may include a convolutional decoder (not shown), a de-interleaver (not shown) and a Reed-Solomon decoder (not shown) so as to perform convolutional decoding, de-interleaving and Reed-Solomon decoding.

The demodulator 171 may obtain a stream signal TS by perform demodulation and channel decoding on the digital IF signal DIF received from the broadcast signal receiver 110. The stream signal TS may be a signal in which a video signal, an audio signal and a data signal are multiplexed. For example, the stream signal TS may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 171 may include an ATSC demodulator and a DVB demodulator. The stream signal TS may be input to the DEMUX 172.

The DEMUX 172 demultiplexes an input stream, for example, an MPEG-2 TS into a video signal, an audio signal, and a data signal. The input stream signal may be received from the demodulator 171, the network interface 120, or the external device I/O unit 130.

For example, if the data signal is a coded signal, the coded data signal may carry an Electronic Program Guide (EPG) which includes broadcast information specifying the start time, end time, etc. of scheduled broadcast TV or radio programs. The EPG includes ATSC-Program and System Information Protocol (PSIP) information in case of ATSC and DVB-Service Information (SI) in case of DVB.

The decoder 173 may decode the demultiplexed signals. The decoder 193 may include a video decoder 173a for decoding the demultiplexed video signal and a scaler 173b for scaling the resolution of the decoded video signal so that the video signal can be displayed on the display 180.

The OSD generator 174 may generate an OSD signal to display an object in OSD on the display 180. The OSD signal may provide information related to an image displayed on the display 180. The OSD signal may include a User Interface (UI) through which to receive a control signal for controlling an operation of the image display apparatus 100 or a user command.

In accordance with an embodiment of the present invention, the OSD generator 174 may extract thumbnail images corresponding to play time points of content being reproduced or reproducible on the image display apparatus 100. The OSD generator 174 may generate an OSD signal and output it to the formatter 175 such that a 3D object including an extracted thumbnail image can be viewed by the user.

The formatter 175 may identify the format of a received video signal, referring to a data signal related to the video signal. The formatter 175 may convert the video signal to a format suitable for the display 180 and then output the video signal to the display 180.

In this embodiment, the image display apparatus 100 is capable of displaying 3D images on the display 180. Particularly, the formatter 175 may generate a 3D video signal in a format suitable for the display 180, from an input video signal. The 3D video signal may include a left-eye image signal and/or a right-eye image signal. As described before, the left-eye image signal and the right-eye image signal may be combined into a 3D image. Specifically, the left-eye image signal and the right-eye image signal are used to display a left-eye image and a right-eye image, respectively. The formatter 175 outputs the 3D video signal to the display 180. The display 180 displays a 3D image based on the 3D video signal.

In the embodiment of the present invention, the image display apparatus 100 may display an OSD in the form of a 3D object according to an OSD signal generated from the OSD generator 174. For this purpose, the formatter 175 may convert the OSD signal to a 3D video signal in the format suitable for the display 180 so that the multi-viewpoint images of the 3D object, for example, the left-eye and right-eye images of the 3D object can be displayed on the display 180.

The image display apparatus 100, which has a UI generator, may further include a mixer for mixing video signals received from the decoder 173 and the OSD generator 174 with a UI video signal received from the UI generator. The mixer may reside within the formatter 175.

FIG. 4 illustrates 3D formats available for 3D visualization. The 3D image formats are classified according to layouts of left-eye and right-eye images generated to form a 3D image.

A 3D image may be formed with multi-viewpoint images. The user may view the multi-viewpoint images with his or her left and right eyes. The disparity between the multi-viewpoint images viewed by the left and right eyes gives the illusion of 3D to the user. The multi-viewpoint images that form the 3D image are a left-eye image perceivable to the left eye and a right-eye image perceivable to the right eye in accordance with an exemplary embodiment of the present invention.

Referring to FIG. 4A, the left-eye and right-eye images are disposed on the left and right sides, respectively. This is called a side by side format. Referring to FIG. 4B, the left-eye and right-eye images are arranged vertically in a top-down format. Referring to FIG. 4C, a time-division layout of the left-eye and right-eye images is called a frame sequential format. Referring to FIG. 4D, the left-eye and right-eye images alternate with each other line by line. This is called an interlaced format. Referring to FIG. 4E, the left-eye and right-eye images are mixed in the form of boxes in a checker box format.

A video signal included in a signal received from an external device and a GUI video signal created to represent information related to the image display apparatus 100 or enter a command to the image display apparatus 100 may be 3D video signals with which 3D images are realized. The formatter 175 mixes these 3D video signals and outputs the mixed 3D video signal to the display 180.

The formatter 175 may identify the format of the mixed 3D video signal referring to a related data signal. The formatter 175 may process the 3D video signal according to the identified format and output the processed 3D video signal to the display 180. If limited 3D image formats are available to the display 180, the formatter 175 may convert the received 3D video signal to a 3D image format in which the display 180 can display a 3D image and output the converted 3D video signal to the display 180.

The OSD generator 174 may generate an OSD signal. Specifically, the OSD generator 174 may generate a signal for displaying information graphically or as text on the screen of the display 180 based on at least one of a video signal and a data signal or a user input signal received from the remote controller 200 or any other control command input device. The OSD generator 174 may also generate a signal for displaying graphics or text by which the user can enter a control command to the image display apparatus 100. The OSD signal may be output to the display 180, along with processed video and data signals.

The OSD signal, which is a signal generated for displaying graphics or text, may include information about a UI screen, a menu screen, a widget, an icon, etc. that can be displayed on the display 180. The OSD generator 174 may generate an OSD signal in 2D or 3D. The OSD signal generated from the OSD generator 174 may include a 3D GUI video signal which is to be mixed with another video signal in the formatter 175.

The display 180 may display an object according to the OSD signal received from the OSD generator 174. In the exemplary embodiment of the present invention, the object may be one of a volume control button, a channel control button, an image display apparatus control menu, an icon, a navigation tab, a scroll bar, a progressive bar, a text box, and a window.

The user can identify information about the image display apparatus 100 or information about an image displayed in the image display apparatus 100, from an object displayed on the display 180. Additionally, the user can enter a command to the image display apparatus 100 using the object displayed on the display 180. A 3D object is a stereoscopically rendered object, herein. The 3D object may be a Picture-In-Picture (PIP) image, an EPG that provides information about broadcast programs, a menu of the image display apparatus 100, a widget, an icon, etc.

FIG. 5 illustrates various scaling of an image rendered based on a 3D video signal and the resulting various shapes of the image according to an embodiment of the present invention. Scaling the size of a 3D object or control of the inclination of the 3D object will be described below with reference to FIG. 5.

A video processing module such as the scaler 173b of the controller 170 scales up or down a whole 3D image or 3D object 510 at a predetermined ratio. Thus the 3D image or object 510 is contracted into a 3D image or object 513 in FIG. 5(a).

To render an image rotated at a predetermined angle or an image inclined in a predetermined direction, the controller 170 may generate or transform a 3D image or object in the form of a polygon such as a parallelogram or a trapezoid.

The controller 170 may render an image rotated at a predetermined angle or an image inclined in a predetermined direction based on a video signal received from the broadcast station 210, the network server 220, or the external device 230 illustrated in FIG. 1, or based on a video signal internally generated in the controller 170. For this purpose, the video processing module such as the scaler 173b of the controller 170 may generate a 3D image or object in the form of a trapezoid 516 in FIG. 5(b) or a parallelogram 519 in FIG. 5(c).

Through scaling or inclination control of a 3D image or object based on a 3D video signal displayed on the display 180, the controller 170 can reinforce the depth, that is, 3D effect of the 3D image or object.

As stated before, the formatter 175 of the controller 170 may be responsible for scaling a 3D image or object. In FIG. 5, a 3D video signal may be a left-eye image signal, a right-eye image signal, or a combination of both. The formatter 175 separates a 2D video signal or a 3D video signal from a received decoded video signal and further divides the 3D video signal into a left-eye image signal and a right-eye image signal. The formatter 175 may then scale the left-eye and right-eye image signals to one of various shapes illustrated in FIG. 5 and output the scaled images in a format illustrated in FIG. 4. The scaling may precede or follow output formatting.

The formatter 175 may receive an OSD signal generated from the OSD generator 174 or an OSD signal mixed with a decoded video signal, separate a 3D video signal from the received OSD signal, and divide the 3D video signal into a plurality of viewpoint images. For example, the 3D video signal may be separated into left-eye and right-eye image signals, scaled as illustrated in FIG. 5, and output in a format illustrated in FIG. 4.

The OSD generator 174 may scale a 3D image or object generated out of an OSD signal received from the OSD generator 714. If the OSD generator 174 scales the OSD signal, the formatter 175 does not need to scale the OSD signal. In this case, beyond simple OSD signal generation, the OSD generator 174 further scales the OSD signal according to the depth or inclination of the OSD and outputs the scaled OSD signal in a suitable format, for example, a format illustrated in FIG. 4. The output format of the OSD generator 174 may be identical to that of the formatter 175.

Figure 6:
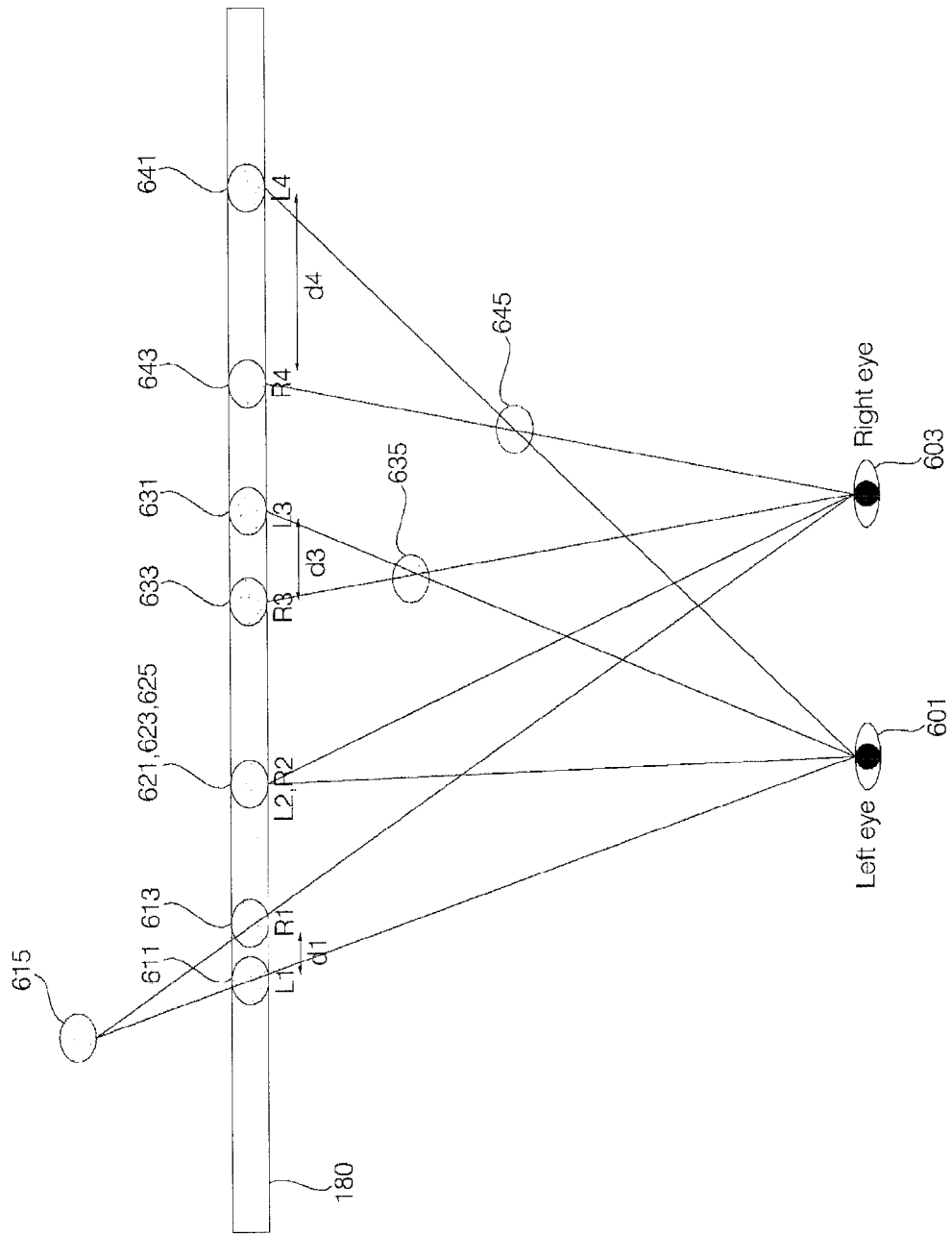

FIG. 6 illustrates different depth illusions of 3D images or 3D objects according to an embodiment of the present invention.

As described before, a 3D image is formed with multi-viewpoint images in the embodiment of the present invention. The multi-viewpoint images may be the left-eye and right-eye images of the 3D image. Images are formed at different positions on the part of a user, according to the disparities between the left-eye and right-eye images of the images, as illustrated in FIG. 6. With reference to FIG. 6, a sense of 3D or a sense of perspective that the user feels about an image according to the disparity between the left-eye and right-eye images of the image will be described below.

Referring to FIG. 6, there are first to fourth images or objects 615, 625, 635 and 645 rendered with different senses of depth.

The first object 615 is composed of a first left-eye image based on a first left-eye image signal and a first right-eye image based on a first right-eye image signal. That is, a video signal for displaying the first object 615 is created using the first left-eye and right-eye image signals. In FIG. 6, the positions of the first left-eye image based on the first left-eye image signal and the first right-eye image based on the first right-eye image signal, and the disparity between the first left-eye and right-eye images are shown. The same description applies to the second, third and fourth objects 625, 635 and 645. For the convenience' sake of description, reference numerals or characters that denote left-eye and right-eye images displayed on the display 180 to create an object, the disparity between the two images, and the object will be uniformly given.

The first object 615 is created by combining a first left-eye image 611 (L1) with a first right-eye image 613 (R1), with a disparity d1 between the first left-eye and right-eye images 611 and 613. The user sees an image as formed at the intersection between a line connecting a left eye 601 to the first left-eye image 611 and a line connecting a right eye 603 to the first right-eye image 613. Therefore, the user is tricked into perceiving the first object 615 as behind the display 180. The distance between the display 180 and the first object 615 is represented as a depth. When a 3D object is perceived to the user as being positioned behind the display 180, the depth of the 3D object is negative-signed. Therefore, the depth of the first object 615 is a negative value.

The second object 625 is created with a second left-eye image 621 (L2) and a second right-eye image 623 (R2) on the display 180. Since the second left-eye and right-eye images 621 and 623 are at the same position on the display, the disparity between the second left-eye and right-eye images 621 and 623 is 0. The user sees an image as formed at the intersection between a line connecting the left eye 601 to the second left-eye image 621 and a line connecting the right eye 603 to the second right-eye image 623. Therefore, the user perceives the second object 625 as positioned on the display 180. In this case, it can be said that the second object 625 is a 2D object. The second object 625 has the same depth as the display 180, that is, a depth of 0.

The third and fourth objects 635 and 645 are examples of 3D objects perceived as protruding toward the user. It may be noted from the third and fourth objects 635 and 645 that the user feels different senses of perspective or different senses of 3D according to different disparities between left-eye and right-eye images.

The third object 635 is created by combining a third left-eye image 631 (L3) with a third right-eye image 633 (R3), with a disparity d3 between the third left-eye and right-eye images 631 and 633. The user sees an image as formed at the intersection between a line connecting the left eye 601 to the third left-eye image 631 and a line connecting the right eye 603 to the third right-eye image 633. Therefore, the user is tricked into perceiving the third object 635 as positioned before the display 180, that is, toward the user. In other words, the user perceives the third object 635 as protruding toward the user from the display 180. Since a 3D object perceived as being positioned before the display 180 has a positive depth value, the depth of the third object 635 is positive-signed.

The fourth object 645 is created by combining a fourth left-eye image 641 (L4) with a fourth right-eye image 643 (R4), with a disparity d4 between the fourth left-eye and right-eye images 641 and 643. d3 and d4 are placed in the relationship of d3<d4. The user sees an image as formed at the intersection between a line connecting the left eye 601 to the fourth left-eye image 641 and a line connecting the right eye 603 to the fourth right-eye image 643. Therefore, the user is tricked into perceiving the fourth object 645 as positioned before the display 180, that is, toward the user, particularly nearer to the user than the third object 635. That is, the user perceives the fourth object 645 as more protruding toward the user from the display 180 than the third object 635. The depth of the fourth object 645 is positive-signed.

The image display apparatus 100 may control the positions of left-eye and right-eye images displayed on the display 180 so that an object created with the left-eye and right-eye images can be perceived to the user as positioned behind or before the display 180. In addition, the image display apparatus 100 may control the depth illusion of the object created with the left-eye and right-eye images by controlling the disparity between the left-eye and right-eye images displayed on the display 180.

It is noted from FIG. 6 that an object formed with a left-eye image and a right-eye image has a positive or negative depth value according to the positions of the left-eye and right-eye images on the display 180. As stated before, an object having a positive depth value is perceived as protruding to the user, whereas an object having a negative depth value is perceived as receding from the user.

FIG. 6 also reveals that the depth illusion of an object, that is, the distance between the display 180 and the position at which a 3D image is perceived as being formed is changed according to the absolute value of the disparity between the left-eye and right-eye images of the object.

FIGS. 7A and 7B illustrate an operation for controlling the depth illusion of an image according to an embodiment of the present invention.

Referring to FIGS. 7A and 7B, the depth illusion of the same image or 3D object varies with the disparity between left-eye and right-eye images 701 and 702 that form the image or 3D object on the display 180. In this exemplary embodiment, the display 180 has a depth of 0 and the depth of an image perceived as protruding from the display 180 is a positive value.

The disparity a between the left-eye image 701 and the right-eye image 702 in FIG. 7A is smaller than the disparity b between the left-eye image 701 and the right-eye image 702 in FIG. 6B. That the left-eye image 701 is farther from the right-eye image 702 in FIG. 7B than in FIG. 7A.

As described before with reference to FIG. 6, a 3D image or 3D object is seen deeper in FIG. 6B than in FIG. 7A. If the depths of two cases are quantified and denoted by a' and b', respectively, the relationship of a'<b' is also established because a<b. That is, the depth of the 3D image gets larger or smaller by widening or narrowing the disparity between the left-eye image 701 and the right-eye image 702.

Figure 8:
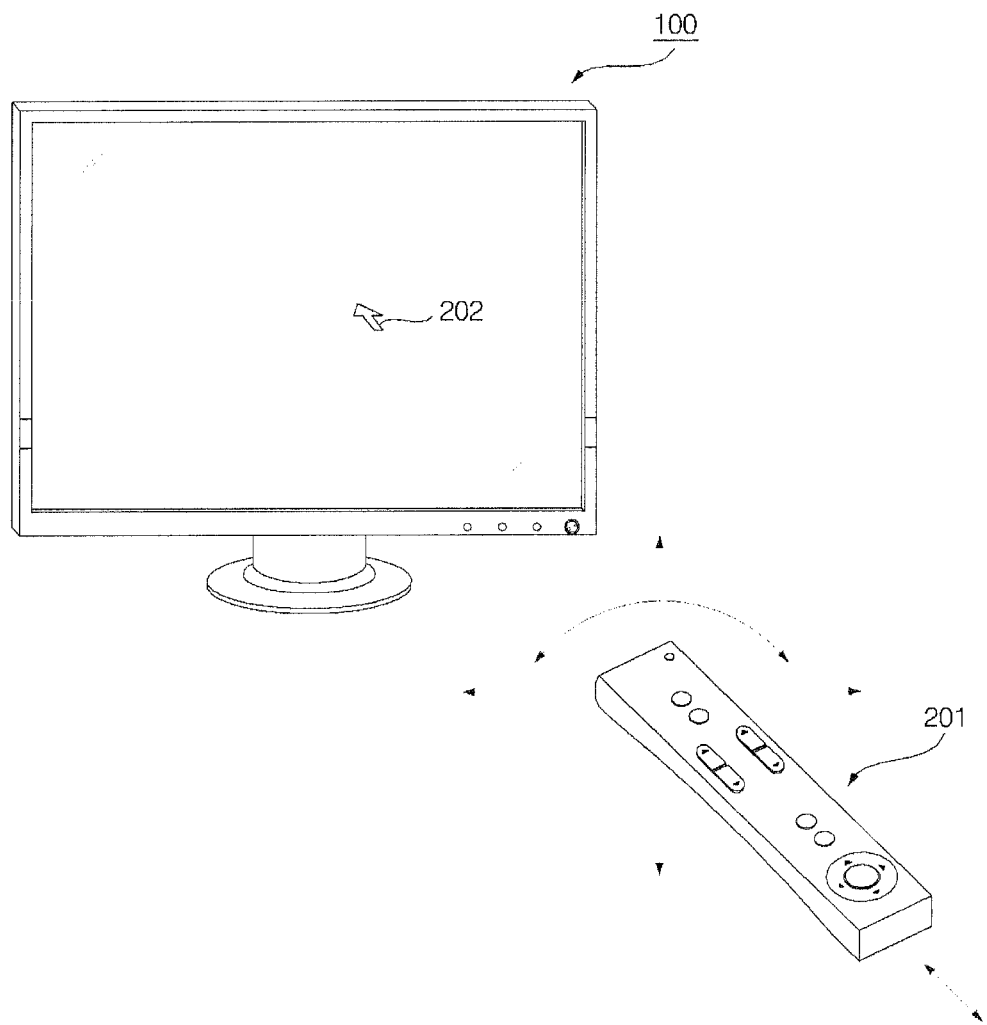
FIG. 8 illustrates a remote controller for the image display apparatus according to an embodiment of the present invention.

FIG. 8 illustrates the remote controller 200 for controlling the image display apparatus 100 according to an embodiment of the present invention.

The image display apparatus 100 may be controlled according to a signal received from the remote controller 200. The user may input commands, such as a power on/off command, a channel switching command, or a sound volume change command, to the image display apparatus 100 through the remote controller 200. The remote controller 200 transmits a signal including a command corresponding to a user manipulation to the image display apparatus 100 and the image display apparatus 100 performs an operation in correspondence with the command included in the received signal.

The remote controller 200 may transmit a signal to the image display apparatus 100 in conformance with an IR communication standard. Alternatively or additionally, the remote controller 200 may transmit a signal to or receive a signal from the image display apparatus 100 in conformance with other wireless communication standards. A kind of the remote controller 200 may sense a motion of the user and transmit a signal including a command corresponding to the sensed motion to the image display apparatus 100. In this embodiment, this kind of the remote controller 200 is referred to as a pointing device.

FIG. 8 is a perspective view of the image display apparatus 100 and a pointing device 201 for entering a command to the image display apparatus 100 according to an embodiment of the present invention.

Referring to FIG. 8, in operation, the pointing device 201 transmits or receives RF signals to or from the image display apparatus 100 according to an RF communication standard according to an embodiment of the present invention. A pointer 202 representing the movement of the pointing device 201 may be displayed on the image display apparatus 100. A user may move the pointing device 201 up and down, back and forth, and side to side or may rotate the pointing device 201. The pointer 202 moves in accordance with the movement of the pointing device 201.

The pointing device 201 may include a sensor capable of detecting a motion. The sensor of the pointing device 201 detects the movement of the pointing device 201 and transmits motion information corresponding to the result of the detection to the image display apparatus 100. Then, the image display apparatus 100 may determine the movement of the pointing device 301 based on the motion information received from the pointing device 2201, and calculate the coordinates of a target point to which the pointer 202 should be shifted in accordance with the movement of the pointing device 201 based on the result of the determination.

The pointer 202 moves according to whether the pointing device 201 moves vertically or horizontally or rotates. The moving speed and direction of the pointer 202 may correspond to the moving speed and direction of the pointing device 201.

In another example, a specific command may be input to the image display apparatus 100 in response to the movement of the pointing device 201. That is, as the pointing device 201 moves back and forth, an image displayed on the image display apparatus 100 may be enlarged or contracted. This embodiment of the present invention does not limit the scope and spirit of the present invention.

Figure 9:
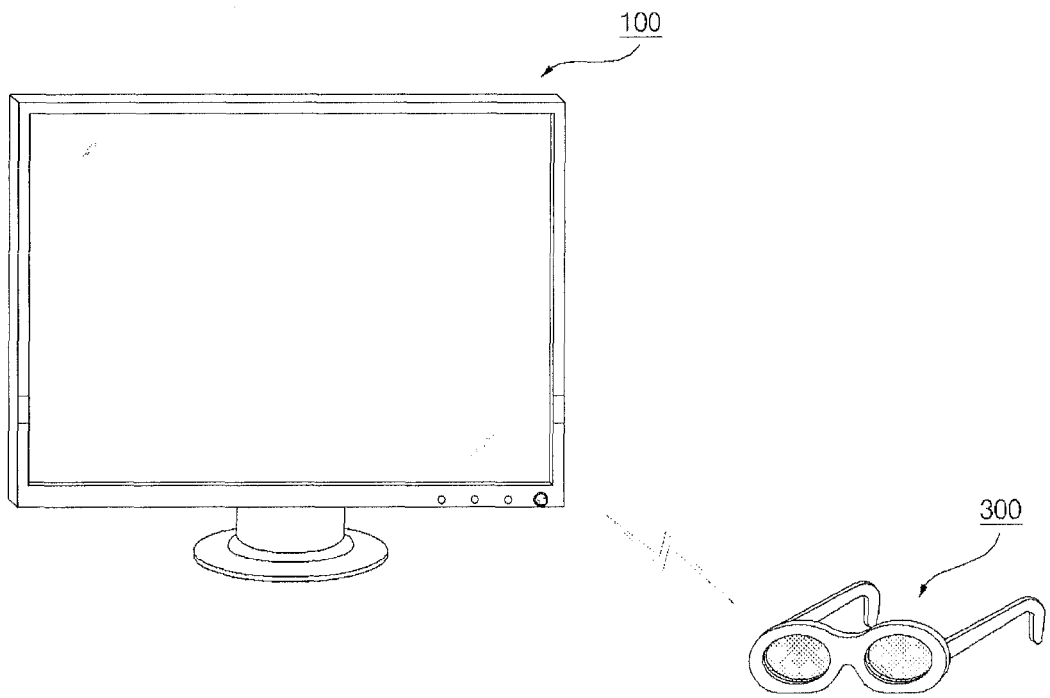
FIG. 9 illustrates shutter glasses for the image display apparatus according to an embodiment of the present invention.

FIG. 9 illustrates the exterior of shutter glasses 300 that a user wears to view 3D images on the image display apparatus 100 according to an embodiment of the present invention.

The image display apparatus 100 displays a plurality of viewpoint images based on a 3D video signal on the display 180. The plurality of viewpoint images may be displayed on the display 180 in a format based on the format of the 3D video signal or in a format that allows the plurality of viewpoints images to be displayed on the display 180. The formatter 175 of the controller 170 outputs a video signal in a format suitable for the display 180.

The user may view an image on the display 180 of the image display apparatus 100 with the shutter glasses 300. The left and right lenses of the shutter glasses 300 are alternately open or closed according to a synchronization signal received from the image display apparatus 100. The image display apparatus 100 may display a left-eye image viewable through the left lens of the shutter glasses 300 and a right-eye image viewable through the right lens of the shutter glasses 300 on the display 180. The image display apparatus 100 transmits the synchronization signal to the shutter glasses 300 according to the left-eye and right-eye images so as to alternately open or close the left and right lenses of the shutter glasses 300.

Figure 10:
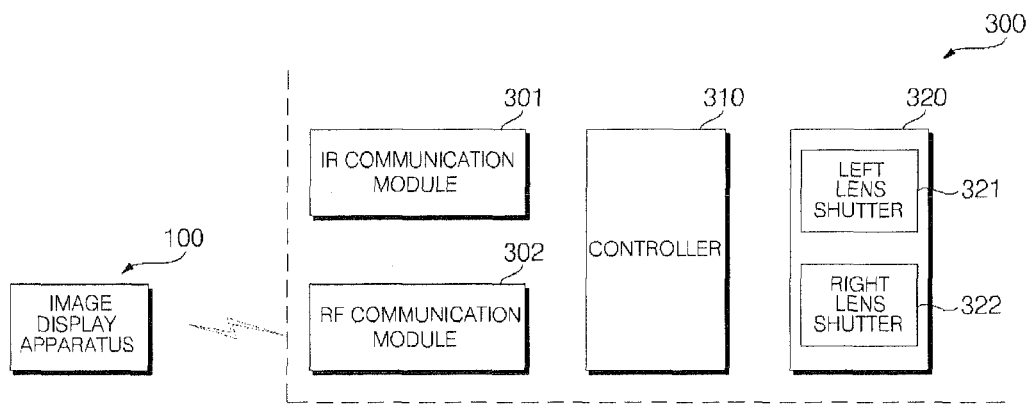
FIG. 10 is a block diagram of the shutter glasses illustrated in FIG. 9.

FIG. 10 is a block diagram of the shutter glasses 300 with the left and right lenses that are alternately opened or closed according to a synchronization signal received from the image display apparatus 100 according to an embodiment of the present invention.

In accordance with the embodiment of the present invention, the shutter glasses 300 includes an IR communication module 301, an RF communication module 302, a controller 310, and a lens shutter 320. The lens shutter 320 is further divided into a left lens shutter 321 for opening or closing the left lens and a right lens shutter 322 for opening or closing the right lens.

The IR communication module 301 may transmit a signal to or receive a signal from the image display apparatus 100 according to an IR communication standard. Before the shutter glasses 300 are paired with the image display apparatus 100, the shutter glasses 300 may transmit a signal carrying their key code information to the image display apparatus 100 according to the IR communication standard. When the image display apparatus 100 transmits a synchronization signal based on the IR communication standard, the shutter glasses 300 may receive the synchronization signal through the IR communication module 301.

The RF communication module 302 may transmit a signal to or receive a signal from the image display apparatus 100 according to an RE communication standard. The shutter glasses 300 may store pairing channel information received from the image display apparatus 100, and the shutter glasses 300 may receive a synchronization signal on a channel corresponding to the stored pairing channel information from the image display apparatus 100.

The controller 310 controls the lens shutter 320 according to a synchronization signal received from the image display apparatus 100 through the IR communication module 301 or the RF communication module 302. The controller 301 may control the left or right lens to be open or closed alternately at the rising time or falling time of the synchronization signal. For this purpose, the controller 301 controls the left lens shutter 321 for opening and closing the left lens and the right lens shutter 322 for opening and closing the right lens.

Figure 11:
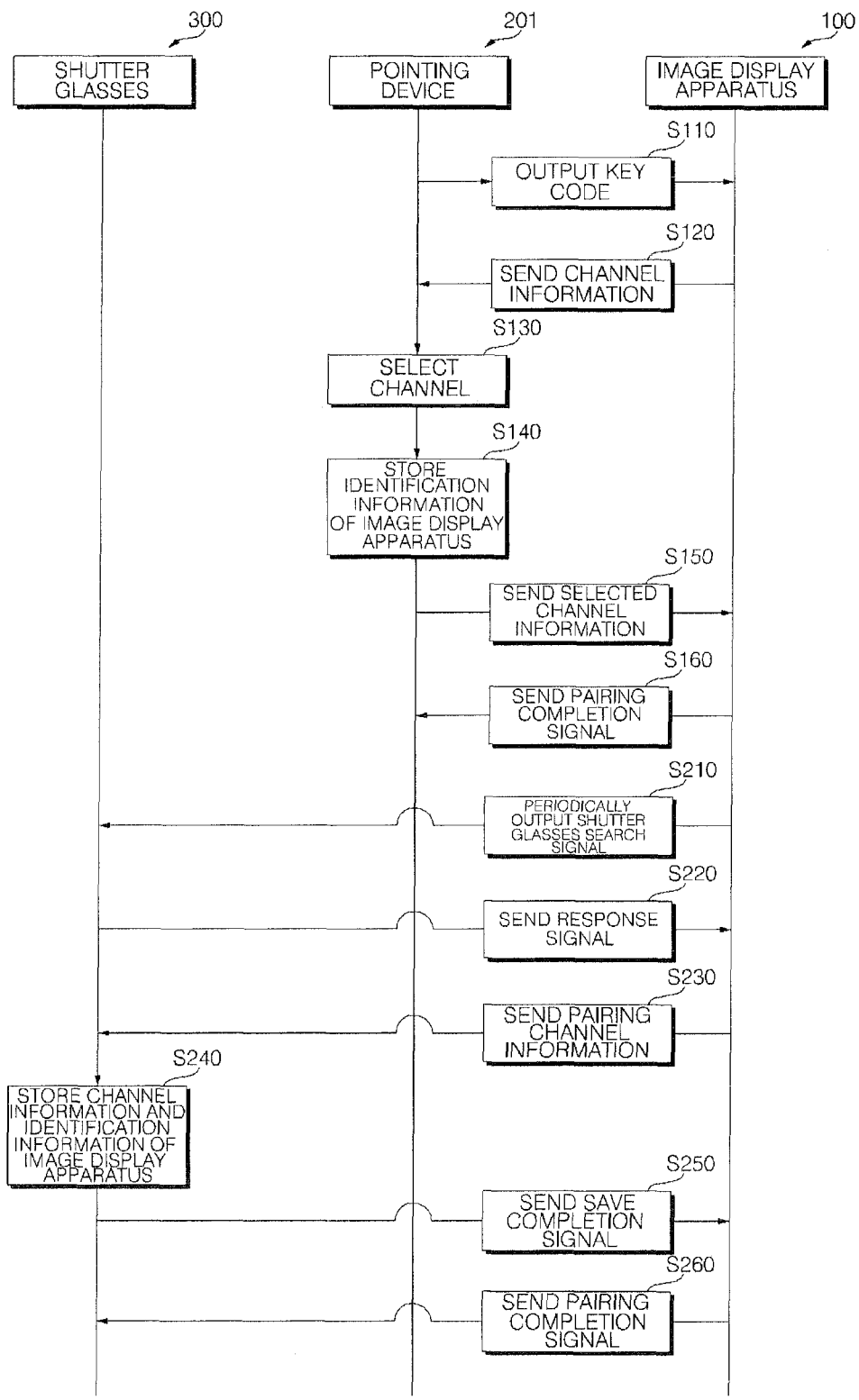
FIGS. 11 to 14 are views referred for describing methods for controlling operations of the image display apparatus and the shutter glasses according to embodiments of the present invention.

FIG. 11 is a diagram illustrating a signal flow illustrating a method for controlling operations of the image display apparatus 100 and the shutter glasses 300 according to an embodiment of the present invention. In accordance with the embodiment of the present invention, after being paired with the pointing device 201, the image display apparatus 100 is paired with the shutter glasses 300 using the same channel address in the embodiment of the present invention. The image display apparatus 100 may transmit signals to or receive signals from the pointing device 201 and the shutter glasses 300 through a single RF communication module.

The user may pair the pointing device 201 with the image display apparatus 100 by manipulating a predetermined key or button of the pointing device 201. Upon receipt of a pairing command from the user, the pointing device 201 outputs a signal including a key code of the pointing device 201 to the image display apparatus 100 (S110). In the embodiment of the present invention, the pointing device 201 operates in conformance with the IR communication standard in transmitting the signal including the key code to the image display apparatus 100.

Upon receipt of the signal including the key code from the pointing device 201, the image display apparatus 100 transmits channel information to the pointing device 201 (S120). The channel information specifies a channel for carrying signals between the image display apparatus 100 and the pointing device 201 after they are paired. The image display apparatus 100 transmits information about channels available as a pairing channel, the key code information of the pointing device 201, and identification information of the image display apparatus 100 to the pointing device 201. The pointing device 201 can identify a signal received from the image display apparatus 100 using the key code information of the pointing device 201 and the identification information of the image display apparatus 100.

The pointing device 201 selects a pairing channel from among the channels indicated by the channel information received from the image display apparatus 100 and stores information about the selected pairing channel (S130). In addition, the pointing device 201 stores the identification information of the image display apparatus 100 received from the image display apparatus 100 (S140). The image display apparatus 100 transmits a signal including its identification information to the pointing device 201 and thus the pointing device 201 can identify that the image display apparatus 100 has transmitted the signal by comparing the identification information of the image display apparatus 100 with the stored identification information.

The pointing device 201 transmits a signal including information about the selected channel to the image display apparatus 100 (S150). The signal also includes the key code of the pointing device 201 and the identification information of the image display apparatus 100. Upon receipt of the signal from the pointing device 201, the image display apparatus 100 determines that the received signal has been transmitted from the pointing device to the image display apparatus 100 by checking the key code of the point device 201 and the identification information of the image display apparatus 100 included in the received signal.

In addition, the image display apparatus 100 stores the selected channel information included in the received signal as pairing channel information of the pointing device 201. Then the image display apparatus 100 transmits a pairing completion signal to the pointing device 201 (S160).

Once the pairing channel information of the pointing device 201 is stored, the image display apparatus 100 may periodically output a shutter glasses search signal through the RF communication module (S210). In the embodiment of the present invention, the shutter glasses 300 are in an RF communication-enabled mode. Accordingly, the shutter glasses 300 may receive the shutter glasses search signal from the image display apparatus 100.

Upon receipt of the shutter glasses search signal from the image display apparatus 100, the shutter glasses 300 transmit a response signal to the shutter glasses search signal to the image display apparatus 100 (S220). The response signal includes a key code of the shutter glasses 300 and the identification information of the image display apparatus 100. Therefore, the image display apparatus 100 may confirm that the signal has been received from the shutter glasses 300.

The image display apparatus 100 transmits pairing channel information to the shutter glasses (S230). The pairing channel information transmitted to the shutter glasses 300 is the pairing channel information of the pointing device 201 stored in the image display apparatus 100 according to the embodiment of the present invention. The image display apparatus 100 further includes its identification information and the key code of the shutter glasses 300 in the signal having the pairing channel information.

Upon receipt of the signal from the image display apparatus 100, the shutter glasses 300 store the pairing channel information and the identification information of the image display apparatus 100 included in the received signal (S240). The shutter glasses 300 establish a channel corresponding to the pairing channel information included in the received signal as a pairing channel for the image display apparatus 100.

After storing the pairing channel information, the shutter glasses 300 transmit a save completion signal to the image display apparatus 100 (S250). The image display apparatus 100 transmits a pairing completion signal to the shutter glasses 300 in response to the save completion signal.

Figure 12:
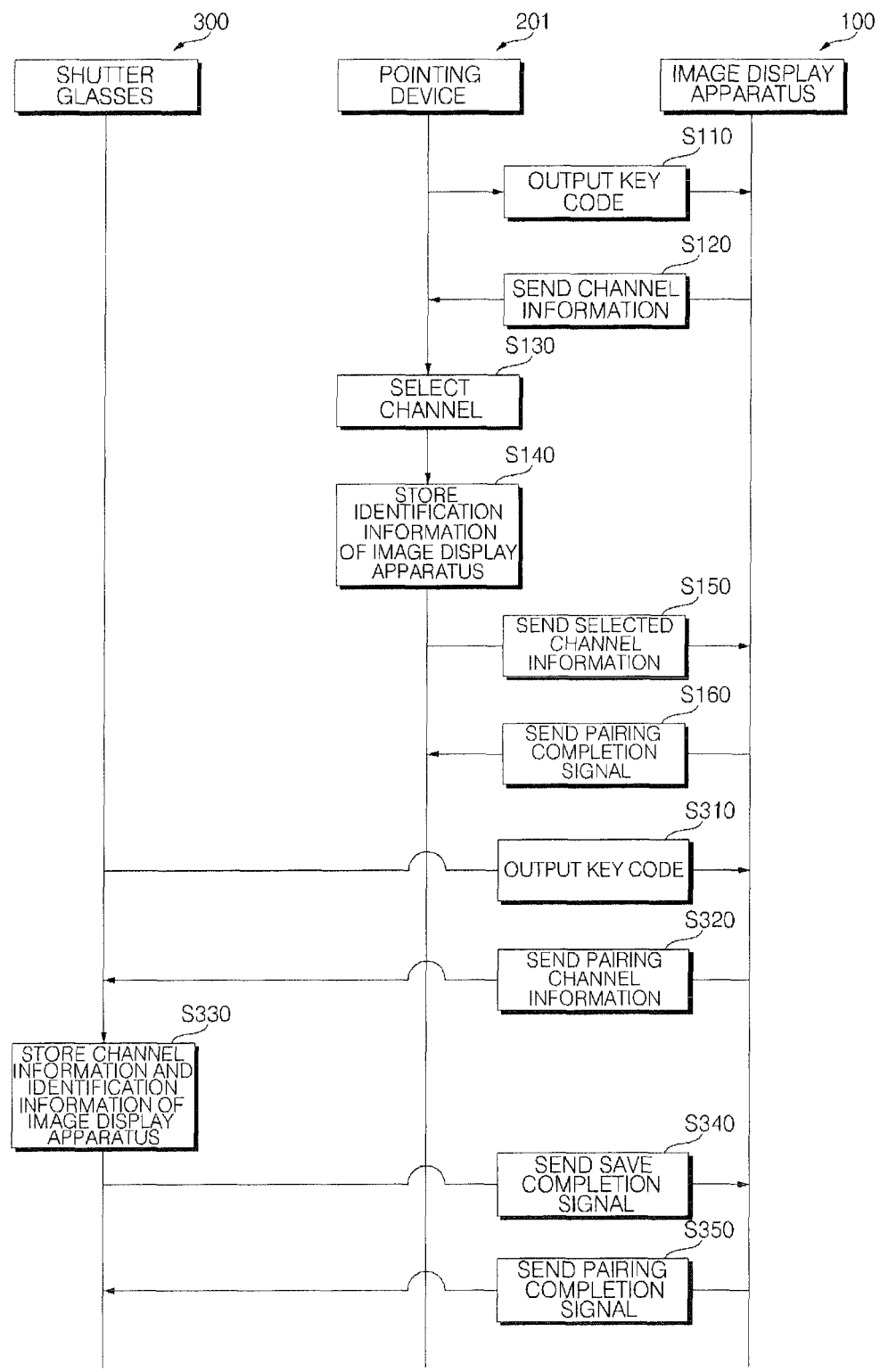

FIG. 12 is a diagram illustrating a signal flow illustrating a method for controlling an operation of the image display apparatus 100 according to another embodiment of the present invention.

In accordance with the embodiment of the present invention, the image display apparatus 100 is paired with the pointing device 201 (S110 to S160). The paired image display apparatus 100 and pointing device 201 exchange signals on a particular pairing channel based on an RF communication standard.

The user may input a pairing command to the shutter glasses 300 by manipulating a predetermined key or button of the shutter glasses 300 to pair the shutter glasses 300 with the image display apparatus 100. Upon receipt of the pairing command from the user, the controller 310 of the shutter glasses 300 outputs a signal including a key code of the shutter glasses 300 (S310). In the embodiment of the present invention, the controller 310 of the shutter glasses 300 controls the IR communication module 301 to transmit the signal including the key code to the image display apparatus 100.

Upon receipt of the signal including the key code from the shutter glasses 300, the image display apparatus 100 transmits pairing channel information to the shutter glasses 300 according to an RF communication standard (S320). The pairing channel information is pairing channel information between the image display apparatus 100 and the pointing device 201. The image display apparatus 100 further includes its identification information and the key code of the shutter glasses 300 in the signal having the pairing channel information, so that the shutter glasses 300 may identify the received signal as transmitted from the image display apparatus 100.

Then the shutter glasses 300 store the pairing channel information and the identification information of the image display apparatus 100 included in the received signal (S330). The shutter glasses 300 establish a channel corresponding to the pairing channel information included in the received signal as a pairing channel between the shutter glasses 300 and the image display apparatus 100. In the embodiment of the present invention, after transmitting a signal including the key code of the shutter glasses 300 according to the IR communication standard, the shutter glasses 300 may receive an RF signal according to the RF communication standard through the RF communication standard. Therefore, the shutter glasses 300 may receive a signal including the pairing channel information from the image display apparatus 100 through the RF communication module 302.

After establishing the pairing channel with the image display apparatus 100 according to the pairing channel information, the shutter glasses 300 transmit a save completion signal to the image display apparatus 100 (S340). The image display apparatus 100 transmits a pairing completion signal to the shutter glasses 300 in response to the save completion signal (S350).

As illustrated in FIGS. 11 and 12, after being paired with the pointing device 201, the image display apparatus 100 may establish the pairing channel of the pointing device 201 as the pairing channel of the shutter glasses 300 in the embodiment of the present invention. It may be further contemplated as another embodiment that after being paired with the shutter glasses 300, the image display apparatus 100 may establish the pairing channel of the shutter glasses 300 as the pairing channel of the pointing device 201.

Therefore, the image display apparatus 100 may transmit signals to and receive signals from the pointing device 201 and the shutter glasses 300 using the same pairing address according to the RF communication standard. The image display apparatus 100 may transmit a signal to or receive a signal from the pointing device 201 at 17 bytes/9 ms, whereas it may transmit a signal to or receive a signal from the shutter glasses 300 at 3 bytes/60 Hz.

Figure 13:
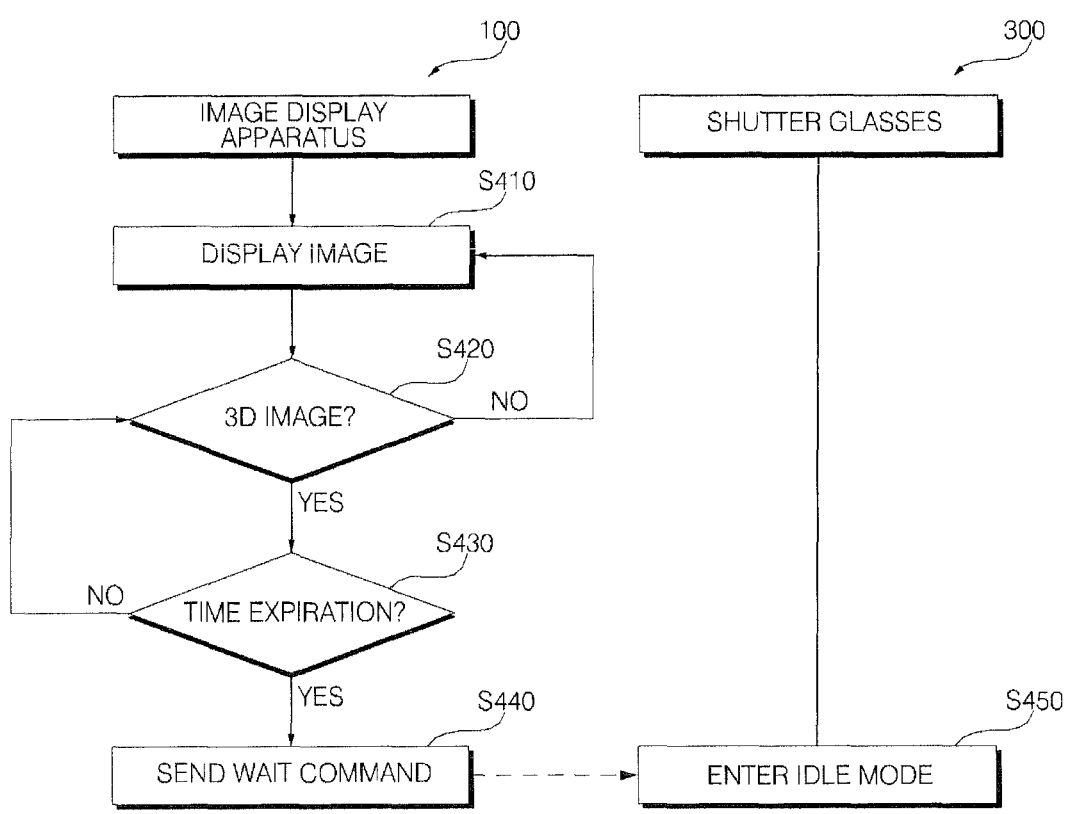

FIG. 13 is a flowchart illustrating a method for controlling operations of the image display apparatus 100 and the shutter glasses 300 according to an embodiment of the present invention.

Referring to FIG. 13, the image display apparatus 100 displays an image on the display 180 (S410). In this embodiment, the image display apparatus 100 may display an image based on a received video signal on the display 180. For example, if the received video signal is a 3D video signal, the image display apparatus 100 may display at least two viewpoint images based on the 3D video signal on the display 180.

If at least two viewpoint images of a 3D image are displayed on the display (S420), the image display apparatus 100 transmits a synchronization signal synchronized with a frequency at which the plurality of viewpoint images are displayed to the shutter glasses 300.

If at least two viewpoint images of a 3D image are not displayed on the display 180, the image display apparatus 100 counts how long time has elapsed after it discontinues displaying a plurality of viewpoint images of a 3D image. In this embodiment, when a plurality of viewpoint images are not displayed any longer, the image display apparatus 100 discontinues transmission of the synchronization signal.

Upon expiration of a predetermined time period after the discontinuation of displaying a plurality of viewpoint images of a 3D image (S430), the image display apparatus 100 transmits a signal including a wait command to the shutter glasses 300 (S440).

Upon receipt of the signal including the wait command, the shutter glasses 300 enters idle mode (S450). Thus the shutter glasses 300 may conserve power that might otherwise be wasted for operating the RF communication module 302. In the idle mode, the shutter glasses 300 periodically monitor the presence of an RF signal directed to the shutter glasses 300 by activating the RF communication module 302. In the presence of an RF signal directed to the shutter glasses 300, the shutter glasses 300 enter active mode. In the active mode, the shutter glasses 300 receive a synchronization signal from the image display apparatus 100 through the RF communication module 302. The shutter glasses 300 open or close the left and right lenses alternately according to the received synchronization signal.

Figure 14:
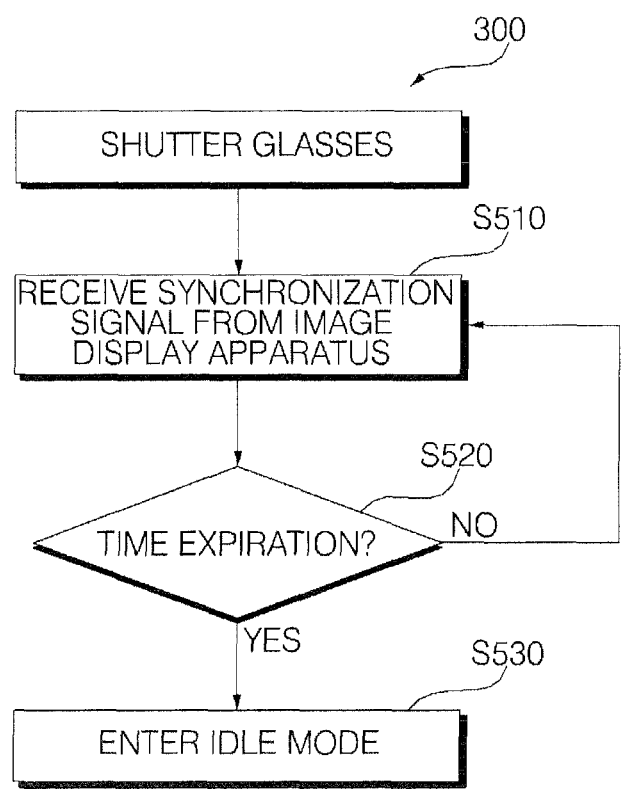

FIG. 14 is a flowchart illustrating a method for controlling an operation of the shutter glasses 300 according to an embodiment of the present invention.

Referring to FIG. 14, the shutter glasses 300 receive a synchronization signal on an established pairing channel from the image display apparatus 100 according to the RF communication standard through the RF communication module 302 (S510). The shutter glasses 300 alternately open or close the left and right lenses according to the received synchronization signal.

The shutter glasses 300 count how long time has elapsed after receiving the synchronization signal from the image display apparatus 100 through the RF communication module 302 and determine whether the elapsed time exceeds a predetermined time period (S520).

If determining that the elapsed time exceeds the predetermined time period, the shutter glasses 300 enter idle mode (S530). In the idle mode, the shutter glasses 300 monitor reception of a synchronization signal based on the RF communication standard from the image display apparatus 100 by periodically activating the RF communication module 302. Accordingly, the shutter glasses 300 can conserve power that might otherwise be consumed for operating the RF module 302 all the time in active mode.

As is apparent from the above description of the embodiments of the present invention, an image display apparatus can control a remote controller and shutter glasses using the same channel address. Especially, after being paired with the remote controller, the image display apparatus can establish a pairing channel of the remote controller as a pairing channel of the shutter glasses. Alternatively, after being paired with the shutter glasses, the image display apparatus can establish a pairing channel of the shutter glasses as a pairing channel of the remote controller. Therefore, the image display apparatus can transmit signals to and receive signals from the remote controller and the shutter glasses through a single RF communication module.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

Therefore, the present invention has been made in view of the above problems, and it is an object of the present invention to provide an image display apparatus for displaying a three-dimensional (3D) image and a method for controlling an operation of the image display apparatus.

It is another object of the present invention to provide shutter glasses with which to view a 3D image on an image display apparatus and a method for controlling an operation of the shutter glasses.

In accordance with an aspect of the present invention, the above and other objects can be accomplished by the provision of a method for controlling an operation of an image display apparatus, including transmitting a signal including information about channels available as a pairing channel to a remote controller in response to key code information of the remote controller received from the remote controller, receiving from the remote controller a signal including information about a channel selected by the remote controller from among the channels available as a pairing channel, establishing the channel selected by the remote controller as a pairing channel of the remote controller, and establishing the pairing channel of the remote controller as a pairing channel of shutter glasses.

In accordance with another aspect of the present invention, provided herein is a method for controlling an operation of an image display apparatus, including transmitting a signal including information about channels available as a pairing channel to shutter glasses in response to key code information of the shutter glasses received from the shutter glasses, receiving from the shutter glasses a signal including information about a channel selected by the shutter glasses from among the channels available as a pairing channel, establishing the channel selected by the shutter glasses as a pairing channel of the shutter glasses, and establishing the pairing channel of the shutter glasses as a pairing channel of a remote controller.

In accordance with a further aspect of the present invention, provided herein is a method for controlling an operation of shutter glasses with left and right lenses that are alternately opened and closed according to a synchronization signal received from an image display apparatus, including entering idle mode, periodically monitoring reception of the synchronization signal from the image display apparatus, and entering active mode in which the left and right lenses of the shutter glasses are alternately opened and closed according to the synchronization signal, upon receipt of the synchronization signal from the image display apparatus.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of an image display apparatus, the method comprising:
   receiving key code information of a remote controller;
   transmitting, in response to receiving the key code information, a first signal to the remote controller, the transmitted first signal including information of available channels for a pairing channel;
   receiving a second signal from the remote controller, the received second signal including information of a selected channel from among the available channels;
   determining the selected channel as a pairing channel of the remote controller; and
   determining the pairing channel of the remote controller as a pairing channel of shutter glasses,
   wherein determining the pairing channel of the shutter glasses includes:
      transmitting a shutter glasses search signal,
      receiving at least one first response signal to the transmitted shutter glasses search signal,
      transmitting, in response to receiving the at least one first response signal, information of the pairing channel of the remote controller,
      receiving, from the shutter glasses, at least one second response signal to the transmitted information of the pairing channel of the remote controller, and
      determining, in response to receiving the at least one second response signal, the pairing channel of the remote controller as the pairing channel of the shutter glasses.

2. The method according to claim 1, further comprising displaying a perceived three-dimensional image on the image display apparatus.

3. The method according to claim 1, further comprising communicating with the shutter glasses and the remote controller using a same channel.

4. The method according to claim 1, further comprising transmitting identification information of the image display apparatus.

5. The method according to claim 1, wherein transmitting the shutter glasses search signal includes periodically transmitting the shutter glasses search signal.

6. The method according to claim 1, wherein determining the pairing channel of the shutter glasses comprises:
   receiving key code information from shutter glasses;
   transmitting, to the shutter glasses, information of the pairing channel of the remote controller;
   receiving a response signal to the transmitted information of the pairing channel of the remote controller; and
   determining, in response to receiving the response signal, the pairing channel of the remote controller as the pairing channel of the shutter glasses.

7. The method according to claim 1, further comprising transmitting a synchronization signal to the shutter glasses on the pairing channel of the shutter glasses.

8. The method according to claim 7, further comprising displaying a plurality of viewpoint images on the image display apparatus, and wherein transmitting the synchronization signal comprises transmitting the synchronization signal when the plurality of viewpoint images are displayed on the image display apparatus.

9. The method according to claim 8, wherein the plurality of viewpoint images are perceived three-dimensional images.

10. The method according to claim 7, further comprising:
    determining whether a predetermined amount of time has elapsed after transmitting the synchronization signal; and
    transmitting a wait command to the shutter glasses when it is determined that the predetermined amount of time has elapsed after transmitting the synchronization signal.

11. A method of an image display apparatus, the method comprising:
    receiving key code information of shutter glasses;
    transmitting, in response to receiving the key code information, a first signal to the shutter glasses, the transmitted first signal including information of available channels for a pairing channel;
    receiving a second signal from the shutter glasses, the received second signal including information of a selected channel from among the available channels;
    determining the selected channel as a pairing channel of the shutter glasses; and
    determining the pairing channel of the shutter glasses as a pairing channel of a remote controller,
    wherein determining the pairing channel of the remote controller includes:
       transmitting a remote controller search signal,
       receiving at least one first response signal to the transmitted remote controller search signal,
       transmitting, in response to receiving the at least one first response signal, information of the pairing channel of the shutter glasses,
       receiving, from the remote controller, at least one second response signal to the transmitted information of the pairing channel of the shutter glasses, and
       determining, in response to receiving the at least one second response signal, the pairing channel of the shutter glasses as the pairing channel of the remote controller.

12. The method according to claim 11, further comprising displaying a perceived three-dimensional image on the image display apparatus.

13. The method according to claim 11, further comprising communicating with the shutter glasses and the remote controller using a same channel.

14. The method according to claim 11, further comprising transmitting identification information of the image display apparatus.

15. The method according to claim 11, wherein transmitting the remote controller search signal comprises periodically transmitting the remote controller search signal.

16. The method according to claim 11, wherein determining the pairing channel of the remote controller comprises:
    receiving key code information from a remote controller;
    transmitting information of the pairing channel of the shutter glasses to the remote controller;
    receiving a response signal to the transmitted information of the pairing channel of the shutter glasses; and
    determining, in response to receiving the response signal, the pairing channel of the shutter glasses as the pairing channel of the remote controller.

17. The method according to claim 11, further comprising transmitting a synchronization signal to the shutter glasses on the pairing channel of the shutter glasses.

18. The method according to claim 17, further comprising displaying a plurality of viewpoint images on the image display apparatus, and wherein transmitting the synchronization signal comprises transmitting the synchronization signal when the plurality of viewpoint images are displayed on the image display apparatus.

19. The method according to claim 18, wherein the plurality of viewpoint images are perceived three-dimensional images.

20. A method of shutter glasses that include a left lens and a right lens, the method comprising:
   providing an idle mode of the shutter glasses;
   monitoring reception of a synchronization signal from an image display apparatus; and
   providing, in response to receiving the synchronization signal, an active mode of the shutter glasses in which the left lens and the right lens of the shutter glasses are alternately opened and closed based on the synchronization signal,
   wherein providing the idle mode includes providing the idle mode in response to receiving a signal that includes a wait command from the image display apparatus.

21. The method according to claim 20, wherein monitoring reception of the synchronization signal includes periodically monitoring reception of the synchronization signal.

22. The method according to claim 20, wherein providing the idle mode comprises:
   determining an amount of time that has elapsed after the shutter glasses receives the synchronization signal;
   determining whether the determined amount of time exceeds predetermined time; and
   entering the idle mode when it is determined that the amount of time exceeds the predetermined time.

23. The method according to claim 20, further comprising transmitting key code information of the shutter glasses to the image display apparatus.

24. The method according to claim 20, further comprising receiving, from the image display apparatus, information of available channels for a pairing channel.

25. The method according to claim 24, further comprising transmitting information of a selected channel from the available channels.

26. The method according to claim 25, further comprising communicating with the image display apparatus using the pairing channel.

27. The method according to claim 20, further comprising transmitting a response signal to a received shutter glasses search signal.

* * * * *